Nov. 29, 1927.
W. M. SHEFFIELD
1,650,771
MOLD
Filed April 21, 1927
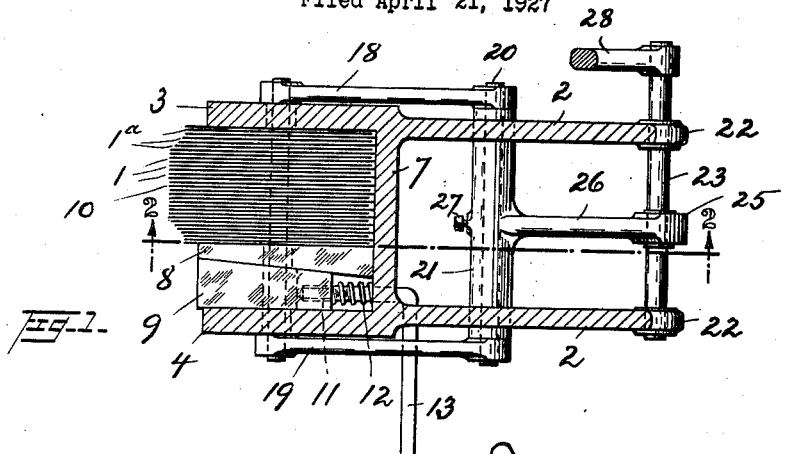
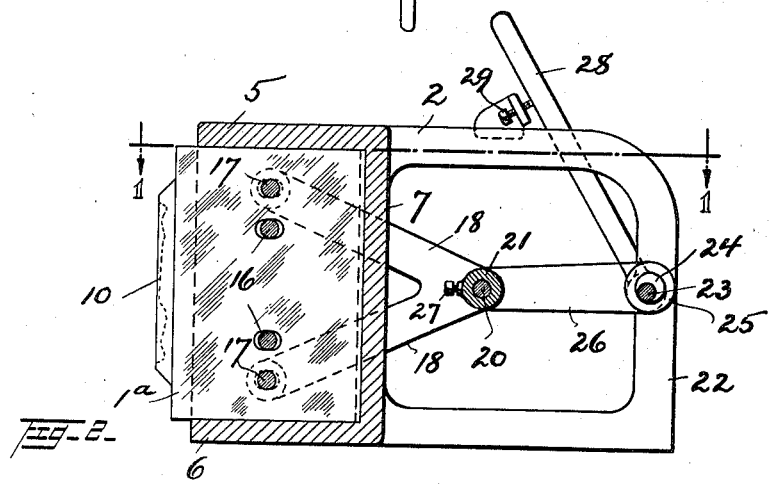
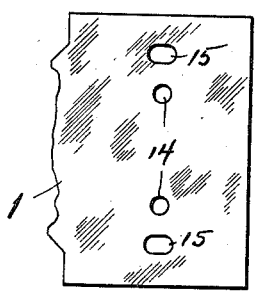
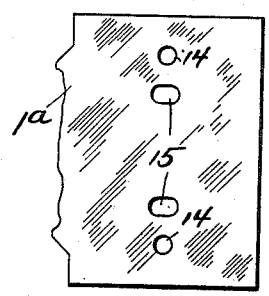
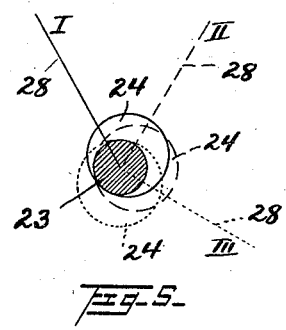
INVENTOR.
William M. Sheffield
BY
ATTORNEY.

Patented Nov. 29, 1927.

1,650,771

UNITED STATES PATENT OFFICE.

WILLIAM MORROW SHEFFIELD, OF NEW YORK, N. Y.

MOLD.

Application filed April 21, 1927. Serial No. 185,405.

My invention relates to laminated molds i. e. molds composed of a plurality of thin plates, or laminæ, preferably of metal, firmly clamped together, the edges of which plates are cut or formed so as to produce the article to be molded. Such molds are used in pulp molding machines operating with a vacuum causing the pulp to adhere to the face of the mold, while the water is drained off. One difficulty with these molds is to separate the molded article from the mold, and the object of the present invention is to produce a mold of the type referred to, in which the plates or laminæ can be moved relatively to each other, after the clamping pressure has been relieved, in the direction of the mold surface, so as to thereby easily and quickly separate the molded article from the mold.

On the annexed drawing, on which I have shown, by way of illustration, one embodiment of a mold made in accordance with my invention, Fig. 1 is a top plan view of the mold, the clamping frame being shown in section along line 1—1 in Fig. 2; Fig. 2 is a section along line 2—2 in Fig. 1; Figs. 3 and 4 show two of the plates, or laminæ; Fig. 5 is a diagram to show the cam action for imparting relative movement to the plates.

As shown, the mold is composed of a plurality of thin plates, or laminæ, 1, 1ª which are placed in an open clamping frame 2 comprising the side walls 3 and 4, the top and bottom walls 5 and 6, and the rear wall 7, within which walls the plates 1 and 1ª are snugly held in close juxtaposition, as indicated in Fig. 1. Within the frame 2 is also provided a wedge-plate 8 and a wedge 9 in engagement with said wedge-plate. In the position of the wedge-plate 8 and wedge 9 shown in Fig. 1, the plates, or laminæ 1, 1ª, are clamped firmly and immovably in position so that the mold cut, or otherwise formed, in the front edges of the plates and indicated at 10 in Figs. 1 and 2 will not be disturbed during the molding operation.

On its rear side, the wedge 9 has centrally arranged therein a threaded bore 11, into which enters the threaded stem 12 of a crank 13, whereby the wedge 9 can be moved into or out of the frame 2 to thereby either tighten or release the plates. It will be appreciated that only a comparatively slight displacement of wedge 9 will suffice to accomplish this purpose. The crank 13 has its bearing in the rear wall 7 of the frame.

As will be seen from Figs. 3 and 4, the alternate plates 1 and 1ª are provided with round and oblong apertures 14 and 15 respectively for the reception of rods 16 and stems 17. The rods 16 serve as guide-rods, whereas the stems 17 are operating stems used for causing the relative movement of the plates. The stems 17, as will be seen from Figs. 1 and 2, are engaged at their outwardly projecting ends by arms 18 and 19 carried on a shaft 20 enclosed within a cylindrical sleeve 21 extending across the frame 2 back of its rear wall 7. In the downwardly extending rear members 22 of the frame is journalled a shaft 23 bearing, or formed with, a cam 24. The latter engages the hub, or boss, 25 of a link 26 extending rearwardly from sleeve 21, which is secured to shaft 20 by a set-screw 27. At the one end of shaft 23 is secured thereto a lever 28. When the lever 28 occupies the position shown in Figs. 1 and 2 and indicated by I in Fig. 5, the cam 24 occupies an intermediate position, in which case the plates, or laminæ composing the mold are in "normal" position, i. e. presenting an uninterrupted mold surface. If the lever 28 is rocked to the position marked II in Fig. 5, the cam 24 by its cam action pulls the link 26 and thereby the arms 18 and 19 toward the right in Figs. 1 and 2, so that the alternate laminæ 1ª (Fig. 4) of the mold are moved back from the mold surface. Then, if lever 28 is rocked to the position III in Fig. 5, the alternate laminæ 1ª are moved forward (i. e. toward the left in Figs. 1 and 2) just enough beyond the mold surface as to separate therefrom the molded article. The elongated apertures 15 in the laminæ 1ª allow them to be moved relative to the laminæ 1, the elongated apertures 15 in which permit the to and fro movement therein of the operating rods 17. As indicated in Fig. 1, similar elongated openings are provided in the side walls 3 and 4 of the frame, the wedge-plate 8 and wedge 9.

At 29 in Fig. 2 is indicated a set-screw serving as an abutment for the lever 28 so as to determine its "normal" position, in which the laminated mold is ready for the molding operation.

It is obvious that the embodiment shown in the drawing is for purposes of illustration only, because the same invention may also be used on laminated molds of the hollow type, such as shown and described in my Patent No. 1,605,358. Moreover, other means than those shown for causing the relative movement of the laminæ of the mold may be used, and other changes may be made without a departure from the essence of my invention.

I claim:

1. A mold comprising a plurality of laminæ capable of relative to and fro movement in the direction of the mold surface.

2. A mold comprising a plurality of laminæ capable of relative to and fro movement in the direction of the mold surface, and a means for clamping said laminæ together when occupying the molding position.

3. A mold comprising a plurality of laminæ capable of relative to and fro movement in the direction of the mold surface, and a means for guiding said laminæ during their relative movement.

4. A mold comprising a plurality of closely contacting laminæ capable of to and from movement in the direction of the mold surface, said laminæ having apertures, and guide-rods extending through said apertures.

5. A mold comprising a plurality of laminæ capable of to and fro movement in the direction of the mold surface, means for guiding said laminæ, and a means for displacing said laminæ in alternate groups.

6. A mold comprising a plurality of closely contacting laminæ capable of to and fro movement in the direction of the mold surface and having apertures, guide-rods extending through said apertures, a means for displacing said laminæ in alternating sequence, and a means for clamping said laminæ together when occupying the molding position.

7. In combination with a frame, a plurality of laminæ contained in said frame and capable of to and fro movement therein in the direction of the mold surface, means for guiding said laminæ, a means for displacing the same in alternate sequence, and a means for clamping said laminæ together when occupying the molding position.

8. In combination with a frame, a plurality of laminæ contained in said frame in close contact with each other and capable of to and fro movement in the direction of the mold surface, said laminæ having slots, guide-rods extending through said slots, operating rods engaging said laminæ for displacing the same, and a single actuating means for actuating said operating rods.

9. In combination with a frame, a plurality of laminæ in close contact with each other and capable of relative to and fro movement in the direction of the mold surface, a means for immovably clamping said laminæ together, a means for relieving said laminæ from clamping pressure, and a means for displacing said laminæ.

10. In combination with a frame, a plurality of laminæ in close contact with each other and capable of relative to and fro movement in the direction of the mold surface, a means for immovably clamping said laminæ together, a means for relieving said laminæ from clamping pressure, a means for displacing said laminæ, and a means for determining the molding position of said laminæ.

In testimony whereof I affix my signature.

WILLIAM MORROW SHEFFIELD.